(12) United States Patent
Andrews

(10) Patent No.: US 12,214,712 B1
(45) Date of Patent: Feb. 4, 2025

(54) VEHICLE ROOF-MOUNTED COLLAPSIBLE TENT

(71) Applicant: Cameron Andrews, Surrey (CA)

(72) Inventor: Cameron Andrews, Surrey (CA)

( * ) Notice: Subject to any disclaimer, the term of this patent is extended or adjusted under 35 U.S.C. 154(b) by 161 days.

(21) Appl. No.: 18/088,841

(22) Filed: Dec. 27, 2022

(51) Int. Cl.
| | |
|---|---|
| *E04H 15/06* | (2006.01) |
| *B60P 3/38* | (2006.01) |
| *B60P 3/39* | (2006.01) |
| *B60R 9/045* | (2006.01) |
| *B66F 3/44* | (2006.01) |
| *B66F 3/46* | (2006.01) |
| *E04H 15/56* | (2006.01) |

(52) U.S. Cl.
CPC .......... *B60P 3/39* (2013.01); *B60P 3/38* (2013.01); *B60R 9/045* (2013.01); *B66F 3/44* (2013.01); *B66F 3/46* (2013.01); *E04H 15/06* (2013.01); *E04H 15/56* (2013.01)

(58) Field of Classification Search
CPC ..... B60P 3/38; B60P 3/39; B60P 3/341; B60J 7/1614; B60R 9/04; B60R 9/045; B66F 3/44; B66F 3/46; E04H 15/06; E04H 15/56
USPC ....... 135/88.16; 296/160; 414/462; 224/309, 224/310, 321, 328
See application file for complete search history.

(56) References Cited

U.S. PATENT DOCUMENTS

| | | | | |
|---|---|---|---|---|
| 2,530,450 A | * | 11/1950 | Cast .......................... | B60P 3/38 135/117 |
| 2,594,065 A | * | 4/1952 | O'Neill .................... | B60P 3/38 135/901 |
| 2,600,799 A | * | 6/1952 | Otvos ..................... | E04H 15/06 182/115 |
| 2,621,836 A | * | 12/1952 | McMiller ................ | B60R 9/055 224/314 |
| 2,683,265 A | * | 7/1954 | Wayne ..................... | B60P 3/38 135/144 |
| 2,811,725 A | * | 11/1957 | Cence ...................... | B60P 3/38 135/117 |
| 3,080,575 A | * | 3/1963 | Johns ....................... | B60P 3/38 135/96 |
| 3,623,762 A | * | 11/1971 | Fagan ...................... | B60P 3/38 135/132 |
| 3,742,966 A | * | 7/1973 | Franzen ................... | B60P 3/38 135/132 |
| 3,844,300 A | * | 10/1974 | Sanders ................... | B60P 3/38 135/904 |
| 4,222,400 A | * | 9/1980 | Reimer ................... | E04H 15/06 135/120.3 |

(Continued)

FOREIGN PATENT DOCUMENTS

WO    2007145855    12/2007

*Primary Examiner* — Robert Canfield
(74) *Attorney, Agent, or Firm* — Kyle A. Fletcher, Esq.

(57) ABSTRACT

The vehicle roof-mounted collapsible tent is a shelter. The vehicle roof-mounted collapsible tent comprises a lift structure, a tent plate, a tent, and a vehicle. The vehicle further comprises a roof rack and an electrical system. The roof rack is a rack that mounts on the roof of the vehicle. The electrical system provides the energy necessary to operate the vehicle roof-mounted collapsible tent. The lift structure secures the tent plate to the roof rack. The tent mounts on the tent plate. The lift structure elevates the tent plate above the roof rack. The lift structure levels the tent plate such that the faces of the tent plate are perpendicularly oriented to the force of gravity.

16 Claims, 4 Drawing Sheets

(56) References Cited

U.S. PATENT DOCUMENTS

| | | | | |
|---|---|---|---|---|
| 4,366,979 A | * | 1/1983 | Pillot | B60P 3/38 |
| | | | | 296/160 |
| 4,427,021 A | * | 1/1984 | Cater, Sr. | E04H 15/48 |
| | | | | 5/310 |
| 4,471,793 A | | 9/1984 | Cattaneo | |
| 4,968,086 A | | 11/1990 | Macisaac | |
| 5,598,591 A | * | 2/1997 | Kelley | B60P 3/38 |
| | | | | 5/118 |
| D397,669 S | | 9/1998 | Komick | |
| 6,993,798 B1 | | 2/2006 | Roberts | |
| 7,146,662 B1 | | 12/2006 | Pollard | |
| 8,123,270 B2 | * | 2/2012 | Baccelli | B60J 7/165 |
| | | | | 296/217 |
| 9,567,767 B2 | | 2/2017 | Kendrick | |
| 10,286,853 B1 | * | 5/2019 | Carbone | B60P 1/003 |
| 10,543,771 B2 | * | 1/2020 | Sautter | B60P 3/34 |
| 2010/0263698 A1 | * | 10/2010 | Chiu | E04H 15/06 |
| | | | | 135/88.17 |
| 2010/0308291 A1 | | 12/2010 | Krones | |
| 2020/0079293 A1 | * | 3/2020 | Gaither | B60R 9/045 |
| 2023/0125670 A1 | * | 4/2023 | Kang | B60R 9/045 |
| | | | | 224/321 |
| 2023/0256913 A1 | * | 8/2023 | Manion | B60R 9/048 |
| | | | | 224/310 |
| 2024/0084616 A1 | * | 3/2024 | Wang | E06C 5/04 |
| 2024/0247516 A1 | * | 7/2024 | Park | B60R 9/058 |

* cited by examiner

VEHICLE ROOF-MOUNTED COLLAPSIBLE TENT

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of tents at least partially supported by vehicles. (E04H15/06)

SUMMARY OF INVENTION

The vehicle roof-mounted collapsible tent is a shelter. The vehicle roof-mounted collapsible tent comprises a lift structure, a tent plate, a tent, and a vehicle. The vehicle further comprises a roof rack and an electrical system. The roof rack is a rack that mounts on the roof of the vehicle. The electrical system provides the energy necessary to operate the vehicle roof-mounted collapsible tent. The lift structure secures the tent plate to the roof rack. The tent mounts on the tent plate. The lift structure elevates the tent plate above the roof rack. The lift structure levels the tent plate such that the faces of the tent plate are perpendicularly oriented to the force of gravity.

These together with additional objects, features and advantages of the vehicle roof-mounted collapsible tent will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle roof-mounted collapsible tent in detail, it is to be understood that the vehicle roof-mounted collapsible tent is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle roof-mounted collapsible tent.

It is therefore important that the claims be regarded as including such equivalent construction insofar as they do not depart from the spirit and scope of the vehicle roof-mounted collapsible tent. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
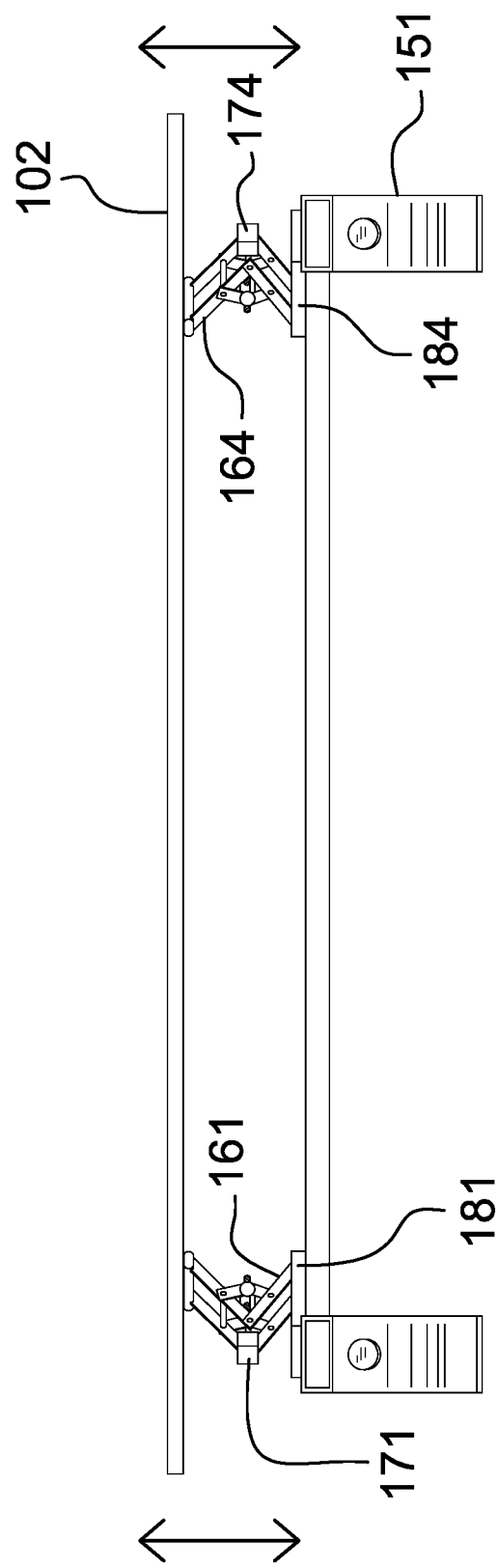
FIG. 1 is a front view of an embodiment of the disclosure.
Figure 2:
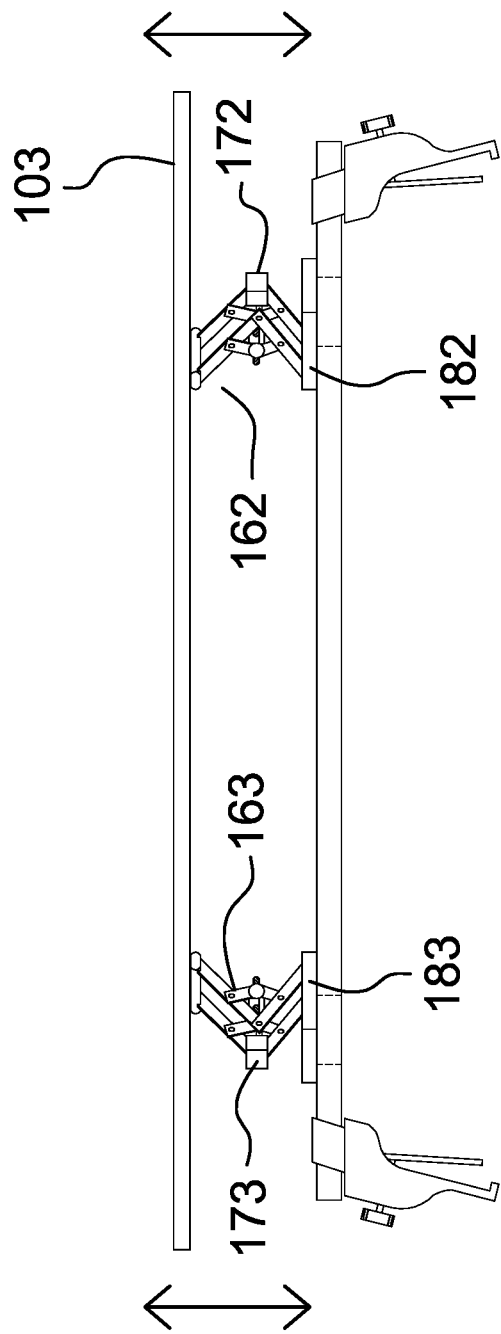
FIG. 2 is a side view of an embodiment of the disclosure.
Figure 3:
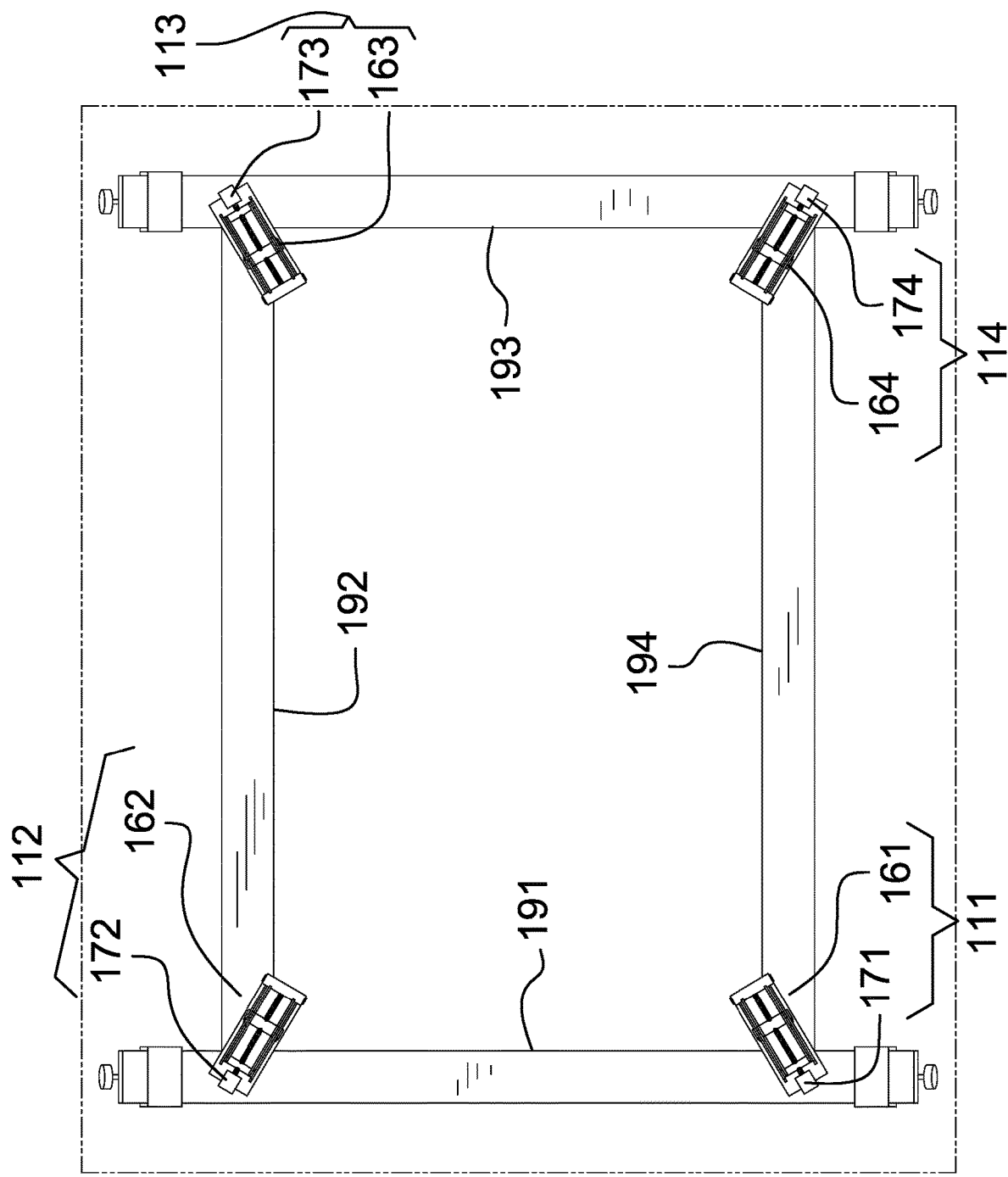
FIG. 3 is a top view of an embodiment of the disclosure.
Figure 4:
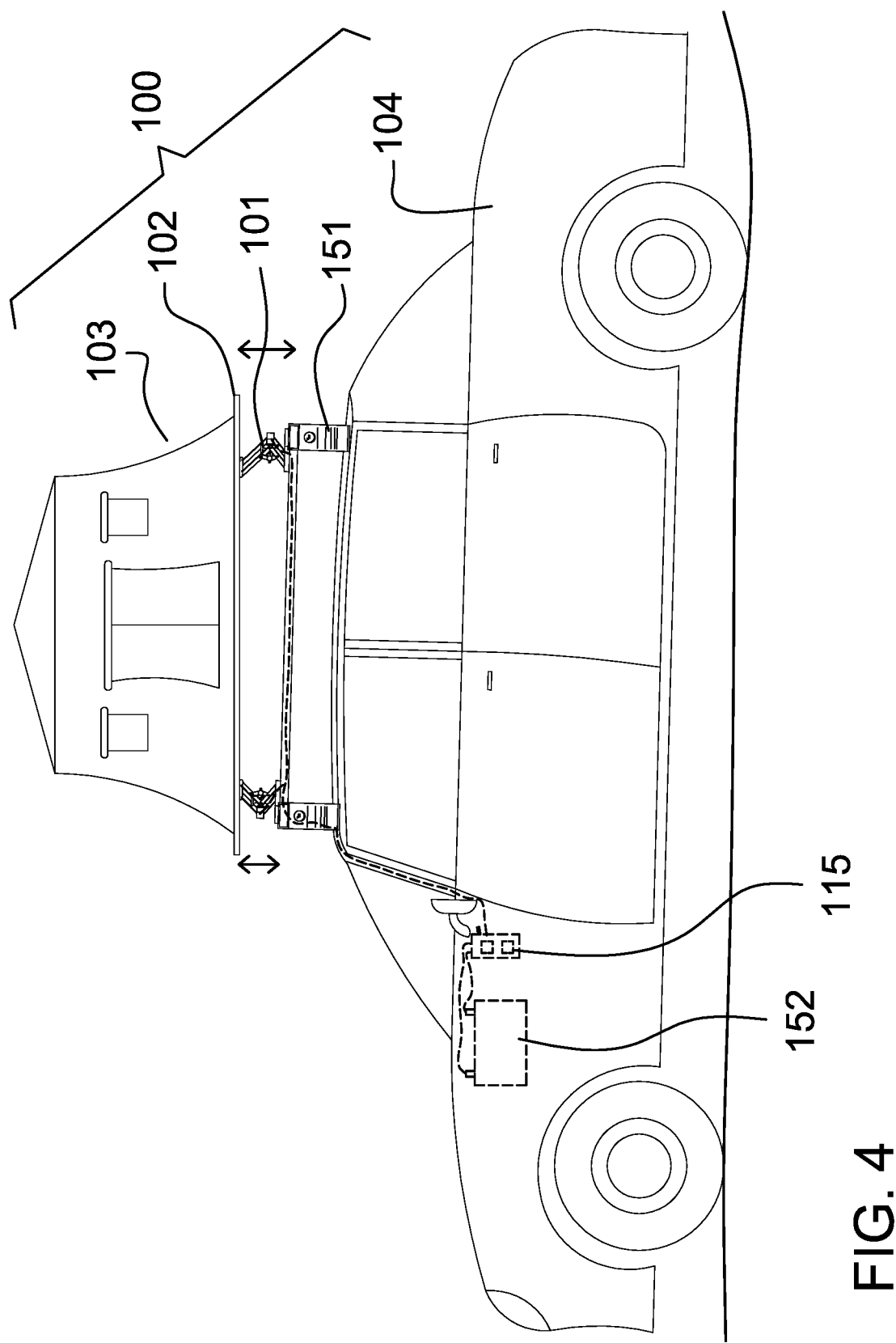
FIG. 4 is an in-use view of an embodiment of the disclosure.

Detailed reference will now be made to one or more potential embodiments of the disclosure, which are illustrated 8 in FIGS. 1 through 4.

The vehicle roof-mounted collapsible tent 100 (hereinafter invention) is a shelter. The invention 100 comprises a lift structure 101, a tent 103 plate 102, a tent 103, and a vehicle 104. The vehicle 104 further comprises a roof rack 151 and an electrical system 152. The roof rack 151 is a rack that mounts on the roof of the vehicle 104. The electrical system 152 provides the energy necessary to operate the invention 100. The lift structure 101 secures the tent 103 plate 102 to the roof rack 151. The tent 103 mounts on the tent 103 plate 102. The lift structure 101 elevates the tent 103 plate 102 above the roof rack 151. The lift structure 101 levels the tent 103 plate 102 such that the faces of the tent 103 plate 102 are perpendicularly oriented to the force of gravity.

The vehicle 104 is defined elsewhere in this disclosure. The vehicle 104 comprises a roof rack 151 and an electrical system 152.

The electrical system 152 is a source of electrical energy. The electrical system 152 is provisioned through the vehicle 104. The electrical system 152 provides the electric energy necessary to operate the lift structure 101.

The roof rack 151 is a rack. The rack is defined elsewhere in this disclosure. The roof rack 151 mounts on the roof of the vehicle 104. The roof rack 151 is a load bearing structure. The roof rack 151 transfers the load borne by the invention 100 to the vehicle 104. The roof rack 151 further comprises an anterior beam 191, a right beam 192, a posterior beam 193, and a left beam 194.

The anterior beam 191 is a rigid structure. The anterior beam 191 is a load bearing structure. The anterior beam 191 forms the forward structure of the roof rack 151. The anterior beam 191 attaches to the left beam 194 and the right beam 192.

The right beam 192 is a rigid structure. The right beam is a load bearing structure. The right beam 192 forms the forward structure of the roof rack 151. The right beam 192 attaches to the anterior beam 191 and the posterior beam 193.

The posterior beam 193 is a rigid structure. The posterior beam 193 is a load bearing structure. The posterior beam 193 forms the forward structure of the roof rack 151. The posterior beam 193 attaches to the right beam 192 and the left beam 194.

The left beam 194 is a rigid structure. The left beam 194 is a load bearing structure. The left beam 194 forms the forward structure of the roof rack 151. The left beam 194 attaches to the posterior beam 193 and the anterior beam 191.

The tent 103 is a structure that forms a protected space. The tent 103 is defined elsewhere in this disclosure.

The tent 103 plate 102 is a rigid structure. The tent 103 plate 102 is a disk shaped structure. The tent 103 plate 102 forms a platform. The tent 103 mounts on the tent 103 plate 102 such that the tent 103 is elevated above the ground. The lift structure 101 secures the tent 103 plate 102 to the roof rack 151 of the vehicle 104. The lift structure 101 controls and adjusts the orientation of the tent 103 plate 102 such that the platform formed by the tent 103 plate 102 is horizontally oriented. The lift structure 101 controls and adjusts the elevation of the tent 103 plate 102.

The lift structure 101 is a mechanical structure. The lift structure 101 is an electrically powered structure. The lift structure 101 draws electric energy from the electrical system 152 of the vehicle 104. The lift structure 101 attaches to the roof rack 151 of the vehicle 104. The lift structure 101 secures the tent 103 plate 102 to the roof rack 151. The lift structure 101 elevates the tent 103 plate 102 above the roof rack 151. The elevation of the tent 103 plate 102 is adjustable. By adjustable is meant that the lift structure 101 can change the elevation of the tent 103 plate 102 above the roof rack 151. The lift structure 101 levels the tent 103 plate 102. By leveling the tent 103 plate 102 is meant that the lift structure 101 adjusts the orientation of the tent 103 plate 102 such that the horizontally oriented faces of the disk structure of the tent 103 plate 102 are perpendicular to the force of gravity.

The lift structure 101 comprises an anterior left jack 111, an anterior right jack 112, a posterior right jack 113, a posterior left jack 114, and a control panel 115.

The anterior left jack 111 is a jack. The anterior left jack 111 is electrically powered. The anterior left jack 111 is a load bearing structure. The anterior left jack 111 secures the tent 103 plate 102 to the roof rack 151 of the vehicle 104. The anterior left jack 111 transfers a portion of the load borne by the tent 103 plate 102 to the roof rack 151. The anterior left jack 111 elevates the tent 103 plate 102 above the roof rack 151. The anterior left jack 111 attaches to the roof rack 151 at the location where the anterior beam 191 joins the left beam 194. The anterior left jack 111 adjusts the elevation of the tent 103 plate 102 relative to the point on the roof rack 151 where the anterior beam 191 joins the left beam 194.

The anterior right jack 112 is a jack. The anterior right jack 112 is electrically powered. The anterior right jack 112 is a load bearing structure. The anterior right jack 112 secures the tent 103 plate 102 to the roof rack 151 of the vehicle 104. The anterior right jack 112 transfers a portion of the load borne by the tent 103 plate 102 to the roof rack 151. The anterior right jack 112 elevates the tent 103 plate 102 above the roof rack 151. The anterior right jack 112 attaches to the roof rack 151 at the location where the right beam 192 joins the anterior beam 191. The anterior right jack 112 adjusts the elevation of the tent 103 plate 102 relative to the point on the roof rack 151 where the right beam 192 joins the anterior beam 191.

The posterior right jack 113 is a jack. The posterior right jack 113 is electrically powered. The posterior right jack 13 is a load bearing structure. The posterior right jack 113 secures the tent 103 plate 102 to the roof rack 151 of the vehicle 104. The posterior right jack 113 transfers a portion of the load borne by the tent 103 plate 102 to the roof rack 151. The posterior right jack 113 elevates the tent 103 plate 102 above the roof rack 151. The posterior right jack 113 attaches to the roof rack 151 at the location where the posterior beam 193 joins the right beam 192. The posterior right jack 113 adjusts the elevation of the tent 103 plate 102 relative to the point on the roof rack 151 where the posterior beam 193 joins the right beam 192.

The posterior left jack 114 is a jack. The posterior left jack 114 is electrically powered. The posterior left jack 114 is a load bearing structure. The posterior left jack 114 secures the tent 103 plate 102 to the roof rack 151 of the vehicle 104. The posterior left jack 114 transfers a portion of the load borne by the tent 103 plate 102 to the roof rack 151. The posterior left jack 114 elevates the tent 103 plate 102 above the roof rack 151. The posterior left jack 114 attaches to the roof rack 151 at the location where the left beam 194 joins the posterior beam 193. The posterior left jack 114 adjusts the elevation of the tent 103 plate 102 relative to the point on the roof rack 151 where the left beam 194 joins the posterior beam 193.

The anterior left jack 111 further comprises an anterior left lift structure 161, an anterior left motor 171, and an anterior left rack mount 181.

The anterior left lift structure 161 is a mechanical structure. The anterior left lift structure 161 forms the jack structure for the anterior left jack 111. The anterior left lift structure 161 is a load bearing structure. The anterior left lift structure 161 secures the tent 103 plate 102 to the anterior left rack mount 181. The mechanical linkages formed by the anterior left lift structure 161 are adjustable. The adjustable nature of the anterior left lift structure 161 allows the anterior left lift structure 161 to adjust the elevation of the tent 103 relative to the roof rack 151.

The anterior left motor 171 is an electric motor. The anterior left motor 171 is a stepper motor. The anterior left motor 171 converts electric energy into rotational energy. The anterior left motor 171 mechanically connects to the anterior left lift structure 161. The anterior left motor 171 provides the rotational energy to allow the anterior left lift structure 161 to change the elevation of the tent 103 plate 102 relative to the roof rack 151.

The anterior left rack mount 181 is a rigid structure. The anterior left rack mount 181 is a disk shaped structure. The anterior left rack mount 181 physically attaches the anterior left lift structure 161 and the anterior left motor 171 to the roof rack 151.

The anterior right jack 112 further comprises an anterior right lift structure 162, an anterior right motor 172, and an anterior right rack mount 182.

The anterior right lift structure 162 is a mechanical structure. The anterior right lift structure 162 forms the jack structure for the anterior right jack 112. The anterior right lift structure 162 is a load bearing structure. The anterior right lift structure 162 secures the tent 103 plate 102 to the anterior right rack mount 182. The mechanical linkages formed by the anterior right lift structure 162 are adjustable. The adjustable nature of the anterior right lift structure 162 allows the anterior right lift structure 162 to adjust the elevation of the tent 103 relative to the roof rack 151.

The anterior right motor 172 is an electric motor. The anterior right motor 172 is a stepper motor. The anterior right motor 172 converts electric energy into rotational energy. The anterior right motor 172 mechanically connects to the anterior right lift structure 162. The anterior right motor 172 provides the rotational energy to allow the anterior right lift structure to change the elevation of the tent 103 plate 102 relative to the roof rack 151.

The anterior right rack mount 182 is a rigid structure. The anterior right rack mount 182 is a disk shaped structure. The anterior right rack mount 182 physically attaches the anterior right lift structure 162 and the anterior right motor 172 to the roof rack 151.

The posterior right jack 113 further comprises a posterior right lift structure 163, an posterior right motor 173, and a posterior right rack mount 183.

The posterior right lift structure 163 is a mechanical structure. The posterior right lift structure 163 forms the jack structure for the posterior right jack 113. The posterior right lift structure 163 is a load bearing structure. The posterior right lift structure 163 secures the tent 103 plate 102 to the posterior right rack mount 183. The mechanical linkages formed by the posterior right lift structure 163 are adjustable. The adjustable nature of the posterior right lift structure 163 allows the posterior right lift structure 163 to adjust the elevation of the tent 103 relative to the roof rack 151.

The posterior right motor 173 is an electric motor. The posterior right motor 173 is a stepper motor. The posterior right motor 173 converts electric energy into rotational energy. The posterior right motor 173 mechanically connects to the posterior right lift structure 163. The posterior right motor 173 provides the rotational energy to allow the posterior right lift structure 163 to change the elevation of the tent 103 plate 102 relative to the roof rack 151.

The posterior right rack mount 183 is a rigid structure. The posterior right rack mount 183 is a disk shaped structure. The posterior right rack mount 183 physically attaches the posterior right lift structure 163 and the posterior right motor 173 to the roof rack 151.

The posterior left jack 114 further comprises an posterior left lift structure 164, an posterior left motor 174, and an posterior left rack mount 184.

The posterior left lift structure 164 is a mechanical structure. The posterior left lift structure 164 forms the jack structure for the posterior left jack 114. The posterior left lift structure 164 is a load bearing structure. The posterior left lift structure 164 secures the tent 103 plate 102 to the posterior left rack mount 184. The mechanical linkages formed by the posterior left lift structure 164 are adjustable.

The posterior left motor 174 is a stepper motor. The posterior left motor 174 converts electric energy into rotational energy. The posterior left motor 174 mechanically connects to the posterior left lift structure 164. The posterior left motor 174 provides the rotational energy to allow the posterior left lift structure 164 to change the elevation of the tent 103 plate 102 relative to the roof rack 151.

The posterior left rack mount 184 is a rigid structure. The posterior left rack mount 184 is a disk shaped structure. The posterior left rack mount 184 physically attaches the posterior left lift structure 164 and the posterior left motor 174 to the roof rack 151.

The control panel 115 is an electric switching system.

The control panel 115 controls the operation of the anterior left jack 111, the anterior right jack 112, the posterior right jack 113, and the posterior left jack 114. By control is meant that the control panel 115 controls the operation of the anterior left motor 171 to set the elevation of the tent 103 plate 102 relative to the roof rack 151. By control is further meant that the control panel 115 controls the operation of the anterior right motor 172 to set the elevation of the tent 103 plate 102 relative to the roof rack 151. By control is further meant that the control panel 115 controls the operation of the posterior right motor 173 to set the elevation of the tent 103 plate 102 relative to the roof rack 151. By control is further meant that the control panel 115 controls the operation of the posterior left motor 174 to set the elevation of the tent 103 plate 102 relative to the roof rack 151.

The control panel 115 independently controls the operation of the anterior left jack 111, the anterior right jack 112, the posterior right jack 113, and the posterior left jack 114. By independently controls is meant that the elevation of the tent plate 102 relative to the roof rack 151 maintained by the anterior left motor 171 through the control panel 115 does not influence the elevations selected by the control panel 115 for the anterior right motor 172, the posterior right motor 173, and the posterior left motor 174.

Similarly, the elevation of the tent 103 plate 102 relative to the roof rack 151 maintained by the anterior right motor 172 through the control panel 115 does not influence the elevations selected by the control panel 115 for the posterior right motor 173, the posterior left motor 174, and the anterior left motor 171.

Similarly, the elevation of the tent 103 plate 102 relative to the roof rack 151 maintained by the posterior right motor 173 through the control panel 115 does not influence the elevations selected by the control panel 115 for the posterior left motor 174, the anterior left motor 171, and the anterior right motor 172.

Similarly, the elevation of the tent 103 plate 102 relative to the roof rack 151 maintained by the posterior left motor 174 through the control panel 115 does not influence the elevations selected by the control panel 115 for the anterior left motor 171, the anterior right motor 172, and the posterior right motor 173.

The control panel 115 levels the tent 103 plate 102 by controlling the relative elevations of the tent 103 plate 102, the anterior left motor 171, the anterior right motor 172, the posterior right motor 173, and the posterior left motor 174. The control panel 115 controls the operation of the anterior left motor 171 by controlling the flow of electric energy into the anterior left motor 171. The control panel 115 controls the operation of the anterior right motor 172 by controlling the flow of electric energy into the anterior right motor 172. The control panel 115 controls the operation of the posterior right motor 173 by controlling the flow of electric energy into the posterior right motor 173. The control panel 115 controls the operation of the posterior left motor 174 by controlling the flow of electric energy into the posterior left motor 174.

The following definitions were used in this disclosure:

Aft: As used in this disclosure, aft is a term that relates a first object to a second object. When the second object is closer to the stern of a vehicle, the second object is said to be aft of the first object. The term is commonly used on vessels and vehicles.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anterior: As used in this disclosure, anterior is a term that is used to refer to the front side or direction of a structure. When comparing two objects, the anterior object is the object that is closer to the front of the structure.

Barrier: As used in this disclosure, a barrier is a physical obstacle that forms a boundary between a first space and a second space. The barrier prevents the passage of an object between the first space and the second space.

Bow: As used in this disclosure, the bow refers to the anterior side of an object, vehicle, or vessel. Specifically, the bow refers to the structure that leads the object, vehicle, or vessel into the primary sense of direction of the object vehicle, or vessel.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Forward: As used in this disclosure, forward is term that relates a first object to a second object. When the first object is closer to the bow of a vehicle, the first object is said to be forward of the second object. The term is commonly used on vessels and vehicles. See bow, aft, port, starboard, and stern Framework: As used in this disclosure, a framework refers to the substructure of an object that forms the load path for the object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Ground: As used in this disclosure, the ground is a solid supporting surface formed by the Earth. The term level ground means that the supporting surface formed by the ground is roughly perpendicular to the force of gravity. The term underground refers to an object being underneath the superior surface of the ground.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Jack: As used in this disclosure, a jack is a mechanical device for lifting loads by means of a force applied with a lever, screw, or hydraulic press. A jack is also called a lift.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior posterior axis. Lateral movement is often called sideways movement.

Left and Right: As used in this disclosure, the terms left and right are directional references associated with an object. The object is further defined with an anterior surface and a posterior surface. The terms left and right are standardized naming conventions for the lateral directions of the object. The terms left and right use the human body for the initial definition of the orientation. Specifically, when a human body is viewed from posterior side towards the anterior side, the left side of the human body is the lateral side of the human body that contains the heart. The right side of the human body is the lateral side of the body that contains the bulk of the liver. The left and right sides of the human body remain unchanged by changes to the direction from which the human body is viewed. The left side of any object is the same side as the left side of the human body when the object is viewed is viewed from posterior side towards the anterior side. The right side of any object is the same side as the right side of the human body when the object is viewed is viewed from posterior side towards the anterior side. The left and right sides of the object remain unchanged by changes to the direction from which the object is viewed.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Motor: As used in this disclosure, a motor refers to the method of transferring energy from an external power source into rotational mechanical energy.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Platform: As used in this disclosure, a platform is a raised horizontal surface that forms a load path to support objects placed on the superior surface of the platform.

Posterior: As used in this disclosure, posterior is a term that is used to refer to the side of an object that is distal or in the opposite direction of the anterior side. When comparing two items, the posterior item is the item that is distal from the anterior of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains an environment suitable within the protected space that is appropriate for the object; protects the object within the protected space from potential dangers that are outside of the protected space; or, d) maintaining the privacy of the object within the protected space. Use Barrier Private Rack: As used in this disclosure, a rack is a structure that holds or supports and an object in a visible or exposed manner.

Roughly: As used in this disclosure, roughly refers to a comparison between two objects. Roughly means that the difference between one or more parameters of the two compared objects are not significantly different.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Stern: As used in this disclosure, the stern refers to the posterior side of an object, vehicle, or vessel. The stern is distal from the bow along the primary sense of direction.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Tent: As used in this disclosure, a tent is a portable structure used to form a protected space. The tent typically comprises a sheeting that forms the exterior surfaces of the tent and a framework that supports the sheeting to create the protected space.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy. The enclosed passenger space of a vehicle is known as a cab.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A vehicle roof-mounted collapsible tent comprising a lift structure, a tent plate, a tent, and a vehicle;
    wherein the tent is a structure that forms a protected space;
    wherein the vehicle further comprises a roof rack and an electrical system;
    wherein the roof rack is a rack that mounts on the roof of the vehicle;
    wherein the electrical system provides the electric energy necessary to operate the vehicle roof-mounted collapsible tent;
    wherein the lift structure secures the tent plate to the roof rack;
    wherein the tent mounts on the tent plate;
    wherein the roof rack further comprises an anterior beam, a right beam, a posterior beam, and a left beam;
    wherein the lift structure comprises an anterior left jack, an anterior right jack, a posterior right jack, a posterior left jack, and a control panel;
    wherein the anterior left jack attaches to the roof rack at a location where the anterior beam joins the left beam;
    wherein the anterior right jack attaches to the roof rack at a location where the right beam joins the anterior beam;
    wherein the posterior right jack attaches to the roof rack at a location where the posterior beam joins the right beam;
    wherein the posterior left jack attaches to the roof rack at a location where the left beam joins the posterior beam.

2. The vehicle roof-mounted collapsible tent according to claim 1
    wherein the lift structure elevates the tent plate above the roof rack;
    wherein the lift structure levels the tent plate such that the faces of the tent plate are perpendicularly oriented to the force of gravity.

3. The vehicle roof-mounted collapsible tent according to claim 2
    wherein the roof rack mounts on the roof of the vehicle;
    wherein the roof rack is a load bearing structure;
    wherein the roof rack transfers the load borne by the vehicle roof-mounted collapsible tent to the vehicle.

4. The vehicle roof-mounted collapsible tent according to claim 3
    wherein the anterior beam is a rigid structure;
    wherein the anterior beam is a load bearing structure;
    wherein the anterior beam forms the forward structure of the roof rack;
    wherein the anterior beam attaches to the left beam and the right beam;
    wherein the right beam is a rigid structure;
    wherein the right beam is a load bearing structure;
    wherein the right beam forms the forward structure of the roof rack;
    wherein the right beam attaches to the anterior beam and the posterior beam;
    wherein the posterior beam is a rigid structure;
    wherein the posterior beam is a load bearing structure;
    wherein the posterior beam forms the forward structure of the roof rack;
    wherein the posterior beam attaches to the right beam and the left beam;
    wherein the left beam is a rigid structure;
    wherein the left beam is a load bearing structure;
    wherein the left beam forms the forward structure of the roof rack;
    wherein the left beam attaches to the posterior beam and the anterior beam.

5. The vehicle roof-mounted collapsible tent according to claim 4
    wherein the tent plate is a rigid structure;
    wherein the tent plate is a disk shaped structure;
    wherein the tent plate forms a platform;
    wherein the tent mounts on the tent plate such that the tent is elevated above the ground.

6. The vehicle roof-mounted collapsible tent according to claim 5
    wherein the lift structure secures the tent plate to the roof rack of the vehicle;

wherein the lift structure controls and adjusts the orientation of the tent plate such that the platform formed by the tent plate is horizontally oriented;
wherein the lift structure controls and adjusts the elevation of the tent plate.

7. The vehicle roof-mounted collapsible tent according to claim 6
wherein the lift structure is a mechanical structure;
wherein the lift structure is an electrically powered structure;
wherein the lift structure draws electric energy from the electrical system of the vehicle;
wherein the lift structure attaches to the roof rack of the vehicle;
wherein the lift structure secures the tent plate to the roof rack;
wherein the lift structure elevates the tent plate above the roof rack;
wherein the elevation of the tent plate is adjustable;
wherein by adjustable is meant that the lift structure can change the elevation of the tent plate above the roof rack;
wherein the lift structure levels the tent plate;
wherein by leveling the tent plate is meant that the lift structure adjusts the orientation of the tent plate such that the horizontally oriented faces of the disk structure of the tent plate are perpendicular to the force of gravity.

8. The vehicle roof-mounted collapsible tent according to claim 7
wherein the anterior left jack is a jack;
wherein the anterior left jack is electrically powered;
wherein the anterior left jack is a load bearing structure;
wherein the anterior left jack secures the tent plate to the roof rack of the vehicle;
wherein the anterior left jack transfers a portion of the load borne by the tent plate to the roof rack;
wherein the anterior left jack elevates the tent plate above the roof rack;
wherein the anterior left jack adjusts the elevation of the tent plate relative to the point on the roof rack where the anterior beam joins the left beam.

9. The vehicle roof-mounted collapsible tent according to claim 8
wherein the anterior right jack is a jack;
wherein the anterior right jack is electrically powered;
wherein the anterior right jack is a load bearing structure;
wherein the anterior right jack secures the tent plate to the roof rack of the vehicle;
wherein the anterior right jack transfers a portion of the load borne by the tent plate to the roof rack;
wherein the anterior right jack elevates the tent plate above the roof rack;
wherein the anterior right jack adjusts the elevation of the tent plate relative to the point on the roof rack where the right beam joins the anterior beam.

10. The vehicle roof-mounted collapsible tent according to claim 9
wherein the posterior right jack is a jack;
wherein the posterior right jack is electrically powered;
wherein the posterior right jack is a load bearing structure;
wherein the posterior right jack secures the tent plate to the roof rack of the vehicle;
wherein the posterior right jack transfers a portion of the load borne by the tent plate to the roof rack;
wherein the posterior right jack elevates the tent plate above the roof rack;
wherein the posterior right jack adjusts the elevation of the tent plate relative to the point on the roof rack where the posterior beam joins the right beam.

11. The vehicle roof-mounted collapsible tent according to claim 10
wherein the posterior left jack is a jack;
wherein the posterior left jack is electrically powered;
wherein the posterior left jack is a load bearing structure;
wherein the posterior left jack secures the tent plate to the roof rack of the vehicle;
wherein the posterior left jack transfers a portion of the load borne by the tent plate to the roof rack;
wherein the posterior left jack elevates the tent plate above the roof rack;
wherein the posterior left jack adjusts the elevation of the tent plate relative to the point on the roof rack where the left beam joins the posterior beam.

12. The vehicle roof-mounted collapsible tent according to claim 11
wherein the anterior left jack further comprises an anterior left lift structure, an anterior left motor, and an anterior left rack mount;
wherein the anterior left lift structure is a mechanical structure;
wherein the anterior left lift structure forms the jack structure for the anterior left jack;
wherein the anterior left lift structure is a load bearing structure;
wherein the anterior left lift structure secures the tent plate to the anterior left rack mount;
wherein the mechanical linkages formed by the anterior left lift structure are adjustable;
wherein the adjustable nature of the anterior left lift structure allows the anterior left lift structure to adjust the elevation of the tent relative to the roof rack;
wherein the anterior left motor is an electric motor;
wherein the anterior left motor is a stepper motor;
wherein the anterior left motor converts electric energy into rotational energy;
wherein the anterior left motor mechanically connects to the anterior left lift structure;
wherein the anterior left motor provides the rotational energy to allow the anterior left lift structure to change the elevation of the tent plate relative to the roof rack;
wherein the anterior left rack mount is a rigid structure;
wherein the anterior left rack mount is a disk shaped structure;
wherein the anterior left rack mount physically attaches the anterior left lift structure and the anterior left motor to the roof rack.

13. The vehicle roof-mounted collapsible tent according to claim 12
wherein the anterior right jack further comprises an anterior right lift structure, an anterior right motor, and an anterior right rack mount;
wherein the anterior right lift structure is a mechanical structure;
wherein the anterior right lift structure forms the jack structure for the anterior right jack;
wherein the anterior right lift structure is a load bearing structure;
wherein the anterior right lift structure secures the tent plate to the anterior right rack mount;
wherein the mechanical linkages formed by the anterior right lift structure are adjustable;

wherein the adjustable nature of the anterior right lift structure allows the anterior right lift structure to adjust the elevation of the tent relative to the roof rack;

wherein the anterior right motor is an electric motor;

wherein the anterior right motor is a stepper motor;

wherein the anterior right motor converts electric energy into rotational energy;

wherein the anterior right motor mechanically connects to the anterior right lift structure;

wherein the anterior right motor provides the rotational energy to allow the anterior right lift structure to change the elevation of the tent plate relative to the roof rack;

wherein the anterior right rack mount is a rigid structure;

wherein the anterior right rack mount is a disk shaped structure;

wherein the anterior right rack mount physically attaches the anterior right lift structure and the anterior right motor to the roof rack.

14. The vehicle roof-mounted collapsible tent according to claim 13 wherein the posterior right jack further comprises a posterior right lift structure, an posterior right motor, and a posterior right rack mount;

wherein the posterior right lift structure is a mechanical structure;

wherein the posterior right lift structure forms the jack structure for the posterior right jack;

wherein the posterior right lift structure is a load bearing structure;

wherein the posterior right lift structure secures the tent plate to the posterior right rack mount;

wherein the mechanical linkages formed by the posterior right lift structure are adjustable;

wherein the adjustable nature of the posterior right lift structure allows the posterior right lift structure to adjust the elevation of the tent relative to the roof rack;

wherein the posterior right motor is an electric motor;

wherein the posterior right motor is a stepper motor;

wherein the posterior right motor converts electric energy into rotational energy;

wherein the posterior right motor mechanically connects to the posterior right lift structure;

wherein the posterior right motor provides the rotational energy to allow the posterior right lift structure to change the elevation of the tent plate relative to the roof rack;

wherein the posterior right rack mount is a rigid structure;

wherein the posterior right rack mount is a disk shaped structure;

wherein the posterior right rack mount physically attaches the posterior right lift structure and the posterior right motor to the roof rack.

15. The vehicle roof-mounted collapsible tent according to claim 14 wherein the posterior left jack further comprises a posterior left lift structure, a posterior left motor, and a posterior left rack mount;

wherein the posterior left lift structure is a mechanical structure;

wherein the posterior left lift structure forms the jack structure for the posterior left jack;

wherein the posterior left lift structure is a load bearing structure;

wherein the posterior left lift structure secures the tent plate to the posterior left rack mount;

wherein the mechanical linkages formed by the posterior left lift structure are adjustable;

wherein the posterior left motor is a stepper motor;

wherein the posterior left motor converts electric energy into rotational energy;

wherein the posterior left motor mechanically connects to the posterior left lift structure;

wherein the posterior left motor provides the rotational energy to allow the posterior left lift structure to change the elevation of the tent plate relative to the roof rack;

wherein the posterior left rack mount is a rigid structure;

wherein the posterior left rack mount is a disk shaped structure;

wherein the posterior left rack mount physically attaches the posterior left lift structure and the posterior left motor to the roof rack.

16. The vehicle roof-mounted collapsible tent according to claim 15 wherein the control panel is an electric switching system;

wherein the control panel controls the operation of the anterior left jack, the anterior right jack, the posterior right jack, and the posterior left jack;

wherein by control is meant that the control panel controls the operation of the anterior left motor to set the elevation of the tent plate relative to the roof rack;

wherein by control is further meant that the control panel controls the operation of the anterior right motor to set the elevation of the tent plate relative to the roof rack;

wherein by control is further meant that the control panel controls the operation of the posterior right motor to set the elevation of the tent plate relative to the roof rack;

wherein by control is further meant that the control panel controls the operation of the posterior left motor to set the elevation of the tent plate relative to the roof rack;

wherein the control panel independently controls the operation of the anterior left jack, the anterior right jack, the posterior right jack, and the posterior left jack;

wherein by independently controls is meant that the elevation of the tent plate relative to the roof rack maintained by the anterior left motor through the control panel does not influence the elevations selected by the control panel for the anterior right motor, the posterior right motor, and the posterior left motor;

wherein the elevation of the tent plate relative to the roof rack maintained by the anterior right motor through the control panel does not influence the elevations selected by the control panel for the posterior right motor, the posterior left motor, and the anterior left motor;

wherein the elevation of the tent plate relative to the roof rack maintained by the posterior right motor through the control panel does not influence the elevations selected by the control panel for the posterior left motor, the anterior left motor, and the anterior right motor;

wherein the elevation of the tent plate relative to the roof rack maintained by the posterior left motor through the control panel does not influence the elevations selected by the control panel for the anterior left motor, the anterior right motor, and the posterior right motor;

wherein the control panel levels the tent plate by controlling the relative elevations of the tent plate, the anterior left motor, the anterior right motor, the posterior right motor, and the posterior left motor;

wherein the control panel controls the operation of the anterior left motor by controlling the flow of electric energy into the anterior left motor;

wherein the control panel controls the operation of the anterior right motor by controlling the flow of electric energy into the anterior right motor;

wherein the control panel controls the operation of the posterior right motor by controlling the flow of electric energy into the posterior right motor wherein the control panel controls the operation of the posterior left motor by controlling the flow of electric energy into the posterior left motor.

\* \* \* \* \*